as the second fluid 20. By virtue of the initial placement of second fluid 20 and by the resistance to flow within capillary bore 18, second fluid 20 tends to remain at the lower end of stem 14 whereat capillary bore 18 opens to diaphragm 16 forming a reservoir for the second fluid. Between bulb 12 and diaphragm 16 there is placed a first fluid 19 having a relatively larger coefficient of thermal expansion such as alcohol or carbon tetrachloride.

Operation of the invention is now quite apparent. Bulb 12, which is characterized among other things by having a high thermal conductivity, is placed in contact with a subject the temperature of which or whom is to be measured. First fluid 19 rapidly increases in heat until its temperature is in substantial conformity with the temperature of the subject. Accompanying the increase in temperature of first fluid 19 is a corresponding and proportional increase in its pressure. The pressure increase yields a volumetric expansion of first fluid 19 by way of deformation of diaphragm 16 whereby second fluid 20 is forced through capillary bore 18 to a position corresponding to the pressure exerted on it, which is in turn in correspondence with the temperature of the substance under test. Calibrations on tube 14 provide a reading in degrees of the temperature of the subject by virtue of the foremost position of second fluid 20 within the tube.

The two-phase feature of the invention is clear from the fact that two different fluids are used for two different purposes. The thermometer is fast-acting in large part because the coefficient of thermal expansion of the first fluid is quite large in comparison with, for example, the coefficient of thermal expansion of mercury when used alone in a conventional clinical thermometer. The large coefficient of thermal expansion permits use of less first fluid which reaches temperature equilibrium with its surroundings more quickly than a greater amount of fluid. The result is a fast temperature reading. As has been noted above, a large coefficient of thermal expansion may be achieved by the use of a gas rather than a liquid as the first fluid. Since the boiling point of freon-12 at one atmosphere is well below room temperature, freon-12 will be in its gaseous state when used in the present invention unless it is placed under initial pressure substantially in excess of one atmosphere.

Shown in FIG. 2 of the drawing is a slight modification of the first embodiment of the invention shown in FIGS. 1 and 3. In place of calibrated tube 14 there is utilized a pressure gauge 22, the dial calibrations of which are in degrees of temperature rather than in terms of pressure per unit area. The embodiments shown in FIGS. 1-5 are particularly useful in connection with temperature measurements for photographic or other chemical processing.

DESCRIPTION OF A SECOND EMBODIMENT

Referring now to the embodiment shown in FIGS. 6-10, it will be seen that calibrated tube 14a may be bent to provide a more convenient reading angle and that bulb 12a is an oblate spheroid for particular clinical use. In this embodiment of the invention, diaphragm 16a retains substantially all of the characteristics of the diaphragm of the embodiments shown in FIGS. 1-5.

DESCRIPTION OF A THIRD EMBODIMENT

Shown in FIGS. 11-17 is an embodiment useful in connection with normal clinical use such as oral and rectal temperature measurements. Bulb 12a is connected by means of a metal tube 24 and a metal fitting 26 to a calibrated glass capillary tube 14b as follows: Fitting 26 and the open lower portion of tube 14b both have flanged mating surfaces 27 and 29 respectively for fitting in back-to-back relationship and a band 28 is clamped around the enlarged flanged portions. Between flanges 27 and 29 is secured a diaphragm 16b which in this embodiment is a relatively flat elastomeric material as shown in FIG. 17. Diaphragm 16b is the fluid separating and pressure transmitting means between first fluid 19 (located in bulb 12b, in tube 24 and in fitting 26 by means of communicating passageways) and second fluid 20 (in capillary tube 14b). Pressure exerted by thermal expansion of first fluid 19 is transmitted by means of diaphragm 16b to second fluid 20 for reading on the calibrated scale.

Diaphragm 16b also provides protection against chipping of glass flange 29. For further protection against such chipping an O-ring 31 may be provided between that flange and band 28.

In conformity with standard clinical thermometer practice, an enlarged portion 30 is provided in the capillary bulb 18b of tube 14b to retain maximum readings. In common with many standard clinical thermometers, the instrument is useful only in measuring a higher temperature than that at which the instrument initially reads and it is necessary to physically lower or reduce the level of the second fluid in tube 14b as by shaking, centrifugation, or the like to below the indicated temperature of the subject to be tested. Although this is an inconvenience in one sense, it is an advantage in another in that a reading once attained is retained for later use. When the thermometer is removed from the subject the reading thereon will not change unless the bulb is exposed to a higher ambient temperature.

Fitting 26 is provided with a side charging port 32 for ease in filling the instrument with first fluid 19. A sealing plug 34 is also used to close port 32.

DESCRIPTION OF A FOURTH EMBODIMENT

FIGS. 18-23 are illustrative of a fourth embodiment of the invention in which a bifurcated or two-branch probe is shown, particularly in FIGS. 18 and 20. The probe, which is the subject of my co-pending U.S. Pat. application entitled Bifurcated Thermometer Probe, Ser. No. 120,825 filed Mar. 4, 1971, comprises a bifurcated or two-pronged bulb 12c adapted to fit around the fraenum of the tongue. The two prongs of bulb 12c are in communication and together provide a single reservoir for first fluid 19c. The upper portion of bifurcated bulb 12c comprises a single opening adapted to receive an extension shell 36, preferably made of brass or like material. That upper portion, adjacent its opening, is crimped to one end of extension shell 36 with a sealing gasket 38 therebetween. In this embodiment of the invention, sealing gasket 38 is not to be confused with the fluid separating and pressure transmitting means such as diaphragm 16b of the third embodiment, see FIGS. 12 and 17. Gasket 38 is provided with a central hole 39 in alignment with a bore 37 in extension shell 36 for passage of first fluid 19c.

INVENTORS
ROBERT H. ASHTON
JAMES W. PHILLIPS
BY
Mann, Brown, McWilliams + Bradway
ATTORNEYS

INVENTORS
ROBERT H. ASHTON
JAMES W. PHILLIPS

BY
Mann, Brown, McWilliams & Bradway
ATTORNEYS

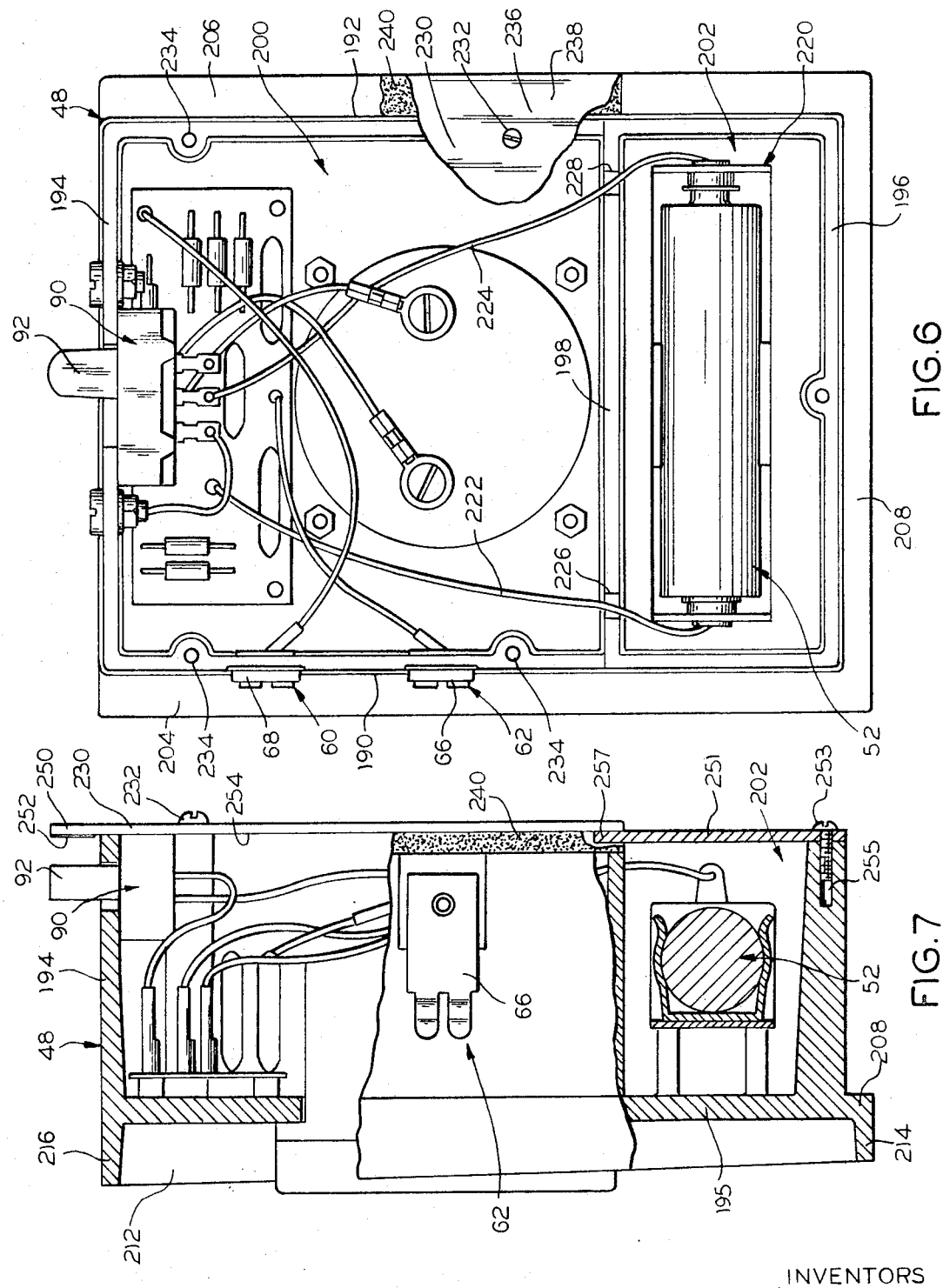

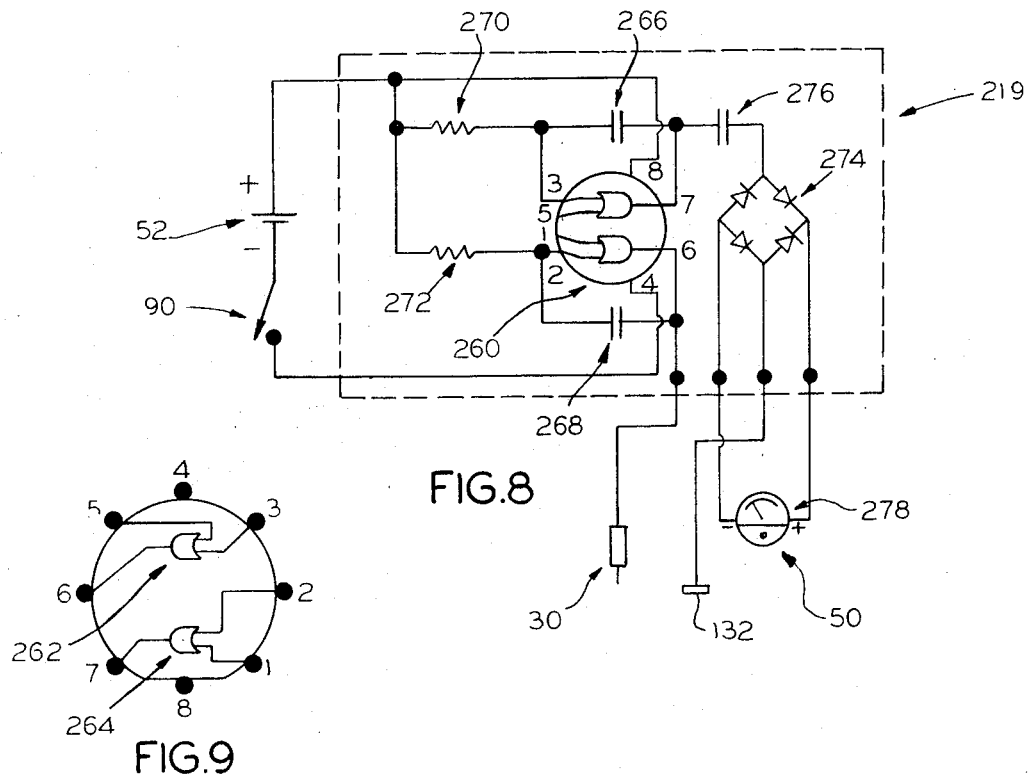
FIG.8
FIG.9
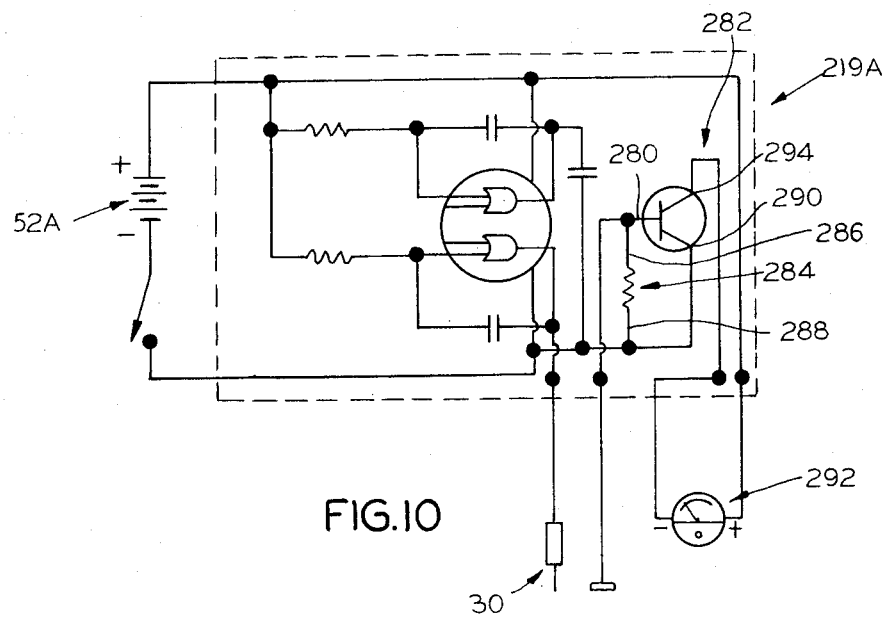
FIG.10
INVENTORS
ROBERT H. ASHTON
JAMES W. PHILLIPS

ELECTRONIC HOOK GAUGE MANOMETER

My invention relates to a hook gauge manometer, and more particularly, to a manometer gauge arranged to measure positive, negative, and differential pressures in the low pressure ranges.

Hook gauges are widely used in precision industrial test work and in scientific laboratories. One of the key factors in providing accurate results expected of hook gauges is being able to determine when the hook gauge probe has been set at the position which will provide the micrometer reading indicating the pressure being measured within the desired range of accuracy.

The principal object of this invention is to provide a hook gauge manometer with an electrical read out arrangement.

Another principal object of the invention is to provide an electrical hook gauge manometer arrangement operated by a low power direct current source that provides an electrical signal when the hook end is disposed where the gauge should be read, while avoiding tip plating and the like of the hook end forming the probe.

Another principal object of the invention is to provide a hook gauge manometer which not only makes highly accurate pressure measurements of the type indicated easier and faster than possible with existing hook gauges, but which also provides an arrangement that is fully portable and readily carried to and from the test site.

Other objects of the invention are to provide a hook gauge manometer which combines modern solid state electronics with proven hook gauge manometer principles, to provide a method of measuring pressures that is simple and easy to perform, and to provide an electronic hook gauge manometer that is economical of manufacture, convenient to set up and use, and long lived and trouble free in operation.

In accordance with this invention, a hook gauge manometer is provided in which the manometer wells are formed in the legs of a U-shaped body formed from acrylic plastic or the like mounted on a rigid base plate provided with adjustable supports for leveling purposes. The manometer wells are each provided with the usual fittings for connecting them to the sources of pressure to be measured, and the well with the low pressure fitting has disposed in same a micrometer mounted probe disposed above the zero datum of the well. Removably mounted between the wells is a housing containing the electronic circuitry which is energized by a pen light battery that energizes a dual semiconductor amplifier integrated circuit device. These amplifiers are arranged to act as a free running multivibrator to provide an alternating current signal which is transmitted through the gauge liquid on contact of the probe therewith. The alternating current signal is converted to a direct current signal which is fed to a direct current detector mounted in the housing that provides a visible signal that the gauge is set for reading. The housing for the electronic circuitry is packaged to slip into place between the manometer wells and make contact with strip type conductor on the surface of the gauge body that are in electrical contact with the probe and gauge liquid to complete the circuit for the alternating current signal.

The instrument is arranged for covering when not in use by a carrying case that cooperates with the instrument base plate to complete a carrying case for readily transporting the instrument between test sites.

Other objects, uses, and advantages will be obvious or become apparent from a consideration of the following detailed description and the application drawings.

In the drawings:

FIG. 6 is a rear view of the gauge housing, with the housing back plate and battery cover plate omitted to show the circuitry involved;

FIG. 7 is a side elevational view of the housing shown in FIG. 6, taken from the left hand side of FIG. 6;

FIG. 8 is a wiring diagram illustrating the electronic circuitry involved in the embodiment of FIGS. 1 – 7;

FIG. 9 schematically illustrates a dual gate logic integrated circuit employed in the circuitry of FIG. 8; and FIG. 10 illustrates a modified circuit arrangement that may be employed instead of the circuitry shown in FIG. 8.

However, it is to be understood that the specific drawing illustrations provided are supplied primarily to comply with the requirements of the Patent Code, and that the invention may have other embodiments that are intended to be covered by the appended claims.

GENERAL DESCRIPTION

Figure 1:
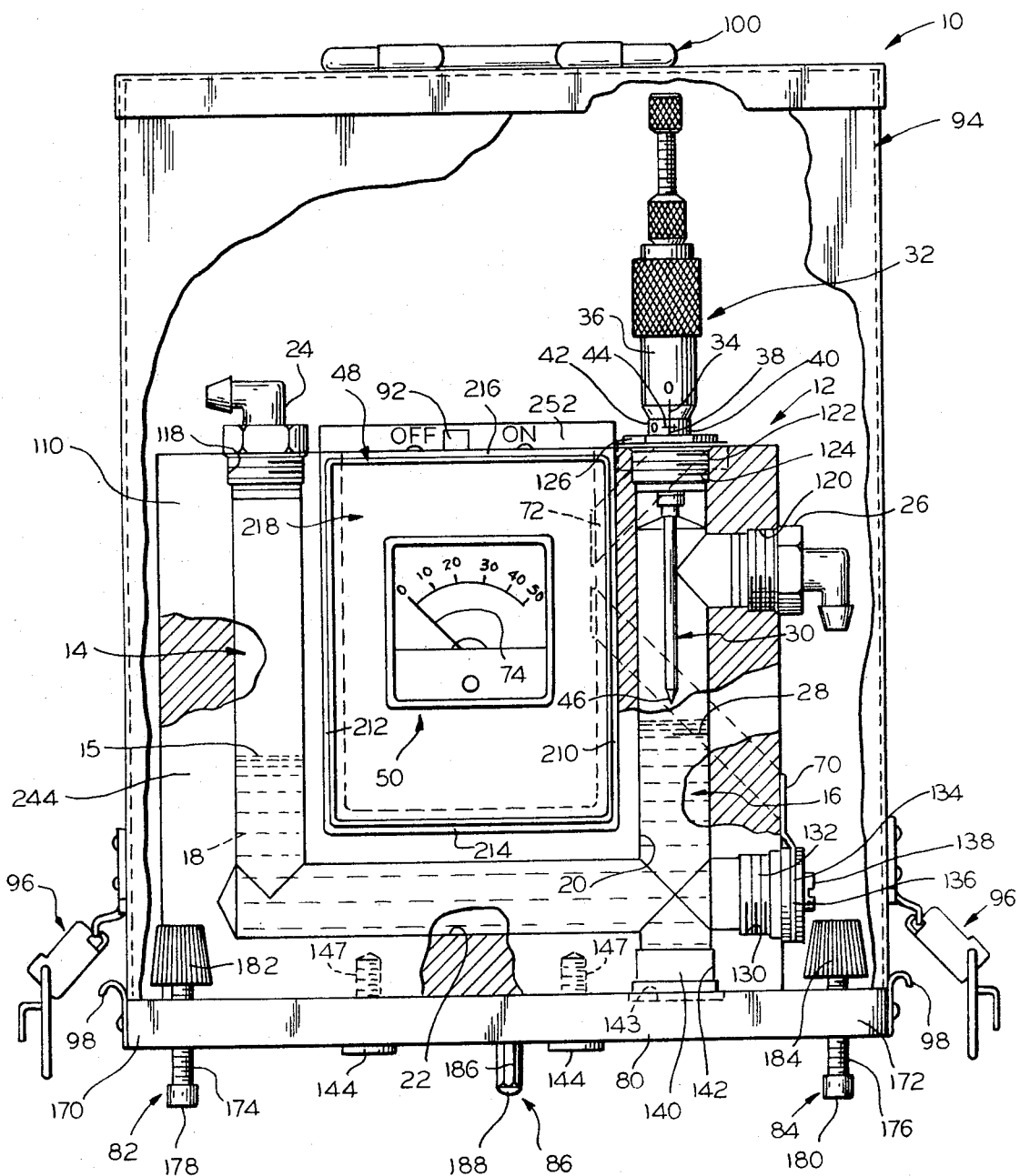
FIG. 1 is a front view of the instrument received within its carrying case, with the carrying case broken away to show the details of the instrument and with the gauge liquid illustrated as it would appear under positive pressure test conditions.

Reference numeral 10 of FIG. 1 generally indicates a hook gauge manometer arranged in accordance with this invention, which comprises a U-shaped body 12 that is transparent and is preferably formed from a suitable acrylic plastic to define a pair of manometer wells 14 and 16 in open communication at their respective lower ends 18 and 20 through a bore 22. Well 14 is equipped with a high pressure fitting 24 while well 16 is equipped with a low pressure fitting 26 and a zero datum line 28 as well as hook or probe 30 that is operably mounted by micrometer 32 for movement within the well 16 longitudinally thereof. The micrometer 32 is calibrated to read in inches water column and has its own zero datum line 34 applied to the micrometer barrel 36 which, when set in alignment with datum line 38 of micrometer sleeve 40, with the edge 42 of the micrometer barrel 36 in alignment with datum line 44 of sleeve 40, and with the tip 46 of probe 30 in alignment with datum line 28, zeros the instrument.

Mounted in body 12 is a housing 48 containing the electronic circuitry and power source of the device as well as read out gauge 50 at the front side of the instrument.

In accordance with this invention, a self contained electronic read out arrangement is provided in which a pen light battery 52 (see FIGS. 6 – 10) provides a source of direct current which is electronically converted, employing the electronic circuitry suggested by FIGS. 8, 9 and 10, to provide an alternating current signal that is sent through the gauge liquid when the probe 12 is moved into contact with the gauge liquid in practicing the invention.

Further in accordance with this invention, the housing 48 is provided with electrical contacts 60 and 62 in the form of the respective spring arms 66 and 68 that respectively engage the respective strip type conductors 70 and 72 that extend into electrical contact with the gauge liquid and probe respectively to complete the electrical circuit through the gauge liquid when the probe contacts same.

Further in accordance with this invention, the electronic circuitry of FIGS. 8, 9 and 10 is arranged to convert the alternating current signal provided when the probe 30 engages the level of the gauge liquid to a direct current signal that is detected by a direct current detector which actuates indicator arm 74 of meter 50 to show that contact between the probe and the gauge liquid has been made and that the micrometer 32 is in condition to be read.

The body 12 is mounted on base plate 80 that includes a pair of adjustable legs 82 and 84 at the front side of the instrument and a single fixed leg 86 centered at the rear side of the instrument. A spirit level 88 is mounted in plate 80 immediately in front of the gauge 50 to show true leveling of the instrument prior to use. Housing 48 carries a suitable off-on switch 90 (see FIGS. 6 and 7) actuated by switch arm 92 that controls the source of direct current power.

Associated with the instrument 10 is carrying case cover 94 provided with suitable lock devices 96 at opposed sides thereof adapted for engagement with the hooks 98 of the base whereby the base and cover 94 may be combined to provide a carrying case for the instrument, suitable handle 100 being provided for ready carrying of the combined instrument and carrying case.

To use the instrument, it is transported to the place of use, disposed on a suitable supporting surface and the carrying case cover 94 removed. Adjustable legs 82 and 84 are suitably maneuvered to level the spirit level 88 assuming the instrument contains gauge fluid and is suitably zeroed. As hereinafter described, the pressure to be measured is applied to the gauge fluid by appropriate connections being made to either the fitting 24 or 26, or both, depending on the tests to be made. Switch arm 92 is moved to the "on" position and probe 30 is lowered by rotating micrometer barrel 36 until the tip 46 of the probe contacts the gauge liquid. The instant of contact is detected by gauge 50 which is manifested by swift movement of the indicator arm 74 away from the zero indicia marking.

The micrometer then may be read in inches of water column to obtain the pressure reading measured.

SPECIFIC DESCRIPTION

Figure 3:
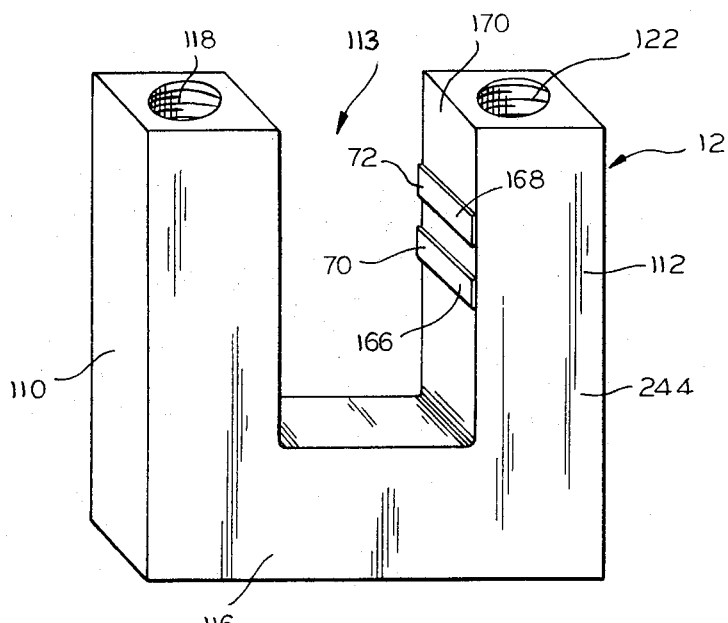
FIG. 3 is a perspective view of the manometer body itself.
Figure 4:
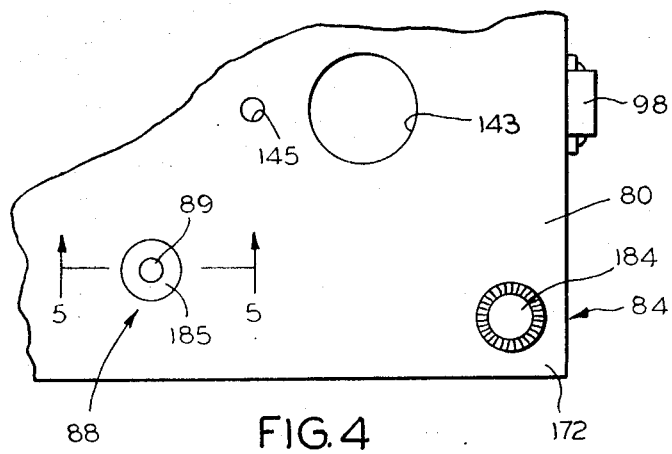
FIG. 4 is a fragmental plan view of a portion of the base plate.
Figure 5:
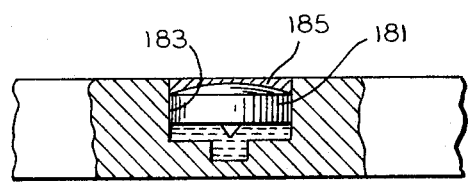
FIG. 5 is a fragmental cross-sectional view taken substantially along line 5—5 of FIG. 4.

Body 12 is shown more specifically in FIG. 3 and preferably has the U-shaped configuration indicated defining spaced apart legs 110 and 112 in which the respective wells 14 and 16 are formed, which are separated by the housing receiving space 113. Legs 110 and 112 are connected by a base portion 116 through which the bore 22 is formed.

The material from which the body 12 is formed is preferably transparent for easy viewing of the gauge liquid 15 (and this is indicated in FIG. 1 but not in FIG. 3). Fittings 24 and 26 are of any type suitable for connecting the sources of high and low pressure to the respective wells, the fitting 24 being applied to the threaded counterbore 118 of body leg 110 while the fitting 26 is applied to the threaded bore 120 of body leg 112. The leg 112 at its upper end is formed with another threaded counterbore 122 which receives the tubular insert 124 that mounts micrometer 32 and includes a hex shaped head 126 shaped for application thereof of a suitable turning tool.

The body base portion 116 includes a threaded counterbore 130 in which is received a suitable threaded plug 132 that is formed of electrical conducting material and has the end 134 of conductive strip 70 clamped in engagement therewith under washer 136 held in place by a suitable screw 138 to establish the electrical connection of the conductive strip 70 with the gauge fluid, which in turn is in contact with the inner end of plug 132.

The lower end of well 16 is closed by a suitable threaded plug 140 received in threaded counterbore 142, and which is received in recess 143 of base plate 80.

The body 12 is suitably secured to the base plate 80 by appropriate screws 144 or equivalent fasteners applied to the body holes 147 and base plate holes 147 that are aligned for this purpose. The rear side of the body is covered with a white backing 149 (suitably bonded in place) to insure ready visibility of the gauge liquid.

Micrometer 32 in practice may be of any suitable type that provides a probe 30 movable longitudinally of the well 16 and suitable indicia for reading in inches water column the movement made by the probe between the gauge liquid levels that are reflected by test conditions conducted using the instrument 10. In the form shown, the micrometer sleeve 40 is suitably fixed within tubular insert 124 and threadably mounts the micrometer barrel 36, with the micrometer barrel 36 including an upwardly extended externally threaded tubular stud portion 150 through which the rod 152 that forms probe 30 extends. Probe rod 152 includes a knurlled knob 155 and is threaded at its upper end, as at 154, to threadedly receive a nut 156 which is internally threaded as at 158 to threadedly receive the barrel stud 150.

It will thus be seen that the point 46 can be adjusted as desired relative to the cylinder barrel by turning the probe rod 152 relative to the nut 156.

Figure 2:
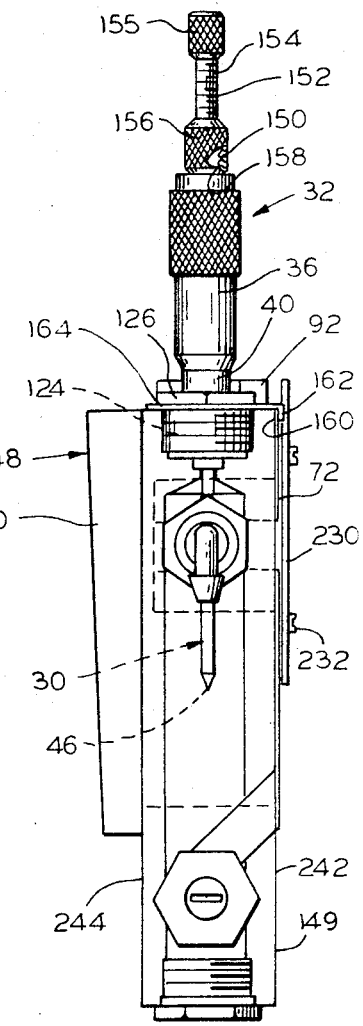
FIG. 2 is a side elevational view of the manometer with the case and base omitted.

The upper end 160 of the conductive stripping 72 is received under the shoulder 162 of washer 164 (see FIG. 2) that is in turn held in place against the body 12 by the head 126 of insert 124. Washer 164, insert 124, the micrometer 32, and the probe rod 152 are formed from electrical conductive materials to complete the circuit through the gauge liquid when the probe tip 46 is in contact therewith.

As indicated in FIG. 3, the ends 166 and 168 of the respective conductive strippings 70 and 72 are disposed in parallelism along the inside surface 170 of the body leg 112 for engagement by the spring arms 66 and 68 respectively that are carried by the housing 48.

Stripping 70 and 72 may be in the form of commercially available copper foil with a pressure sensitive backing for firm adherence to the walls of the body 12 that are indicated.

The base plate 80 is preferably formed from a suitable structurally rigid material such as steel or the like and is threaded at its forward corners 170 and 172 to receive the respective threaded stem members 174 and 176 of adjustable support members 82 and 84. Stem members 174 and 176 each are equipped with respective support surface engaging feet 178 and 180 and suitable knurlled handles 182 and 184 for conveniently rotating the stem members 174 and 176 relative to the base plate.

The fixed support 186 comprises a stud element 186 having a rounded supporting surface engaging end portion 188, and it is hex shaped in cross-sectional configuration for ready mounting in a suitable threaded mounting hole (not shown) formed adjacent the back edge of the base plate 80.

The spirit level 88 comprises a suitable circular level vial 181 suitably mounted in recess 183 of base plate 80 under transparent window 185 that is also suitably fixed within recess 183 above vial 181.

The housing 48 is preferably formed from styrene acrylonitrile or its equivalent and defines side walls 190 and 192, top wall 194, base or front wall 195, and bottom wall 196, which together with a divider wall 198, formed two rearwardly opening compartments 200 and 202. Housing 48 also defines, at its forwardly facing portion, side flanges 204 and 206 and bottom flange 208 which are respectively integral with forwardly projecting flanges 210, 212, and 214; a forwardly projecting flange 216 projects forwardly of the housing top wall 194 and is joined to the respective flanges 210 and 212 at their upper ends whereby the flanges 210, 212, 214 and 216 define a quadrilateral instrument face 218 in which the gauge 50 appears together with suitable trademarking indicia and the like.

The compartment 200 of the housing 48 houses the electronic and associated electrical components making up the circuitry 219 indicated in FIGS. 8 and 9, except for the conductive strippings 70 and 72 and battery 52, the latter being mounted in compartment 202 in suitable battery holder 220 fixed in place in any suitable manner, with leads 222 and 224 passing through suitable openings 226 and 228 in divider wall 198 for connection in the circuitry 219 of FIG. 8.

The spring arms 66 and 68 may be of any suitable type that will provide the desired resilient engaging of the conductive stripping ends 166 and 168 to connect them into the circuiting indicated in FIG. 8.

The compartment 200 is closed by suitable back plate 230 which is secured in place by suitable screws 232 applied to screw holes 234 formed in housing 48. As indicated in FIG. 6, the side edges 236 of the back plate 230 extend beyond the side walls 190 and 192, as at 238, and each side edge extension 238 has applied thereto a strip 240 of foam material suitably bonded to the side edge extensions 238 for engagement with the back surface 242 of body 12 (which surface 242 is defined by backing 149). The flanges 204, 206 and 208 at the forward side of the housing 48 are in coplanar relation and in applying the housing 48 to the housing receiving space 114, they seat against the forwardly facing surface 244 of the body. The application of the screws 232 to the holes 234 to secure the back plate 230 to the housing causes the body 12 to be clamped between the back plate and flanges 204, 206 and 208, with the foam strips 240 deflecting under the pressure as required to bring the back plate 230 firmly against the housing walls 190, 192, 194 and 196.

The upper edge 250 of the back plate extends above the housing top wall 194 and has applied thereto the "off" and "on" indicia that are indicated in FIG. 1; this may be done in any suitable manner, as by forming the indicated words on a label 252 and applying the label to the forwardly facing side 254 of the back plate 30 across the edge 250.

The battery compartment 202 is closed by a separate back plate 251 held in place by a single screw 253 applied to housing hole 255. As indicated in FIG. 7, the upper edge 257 of the back plate 251 extends upwardly behind back plate 230, it being disposed between the two foam strips 240 for easy removal of back plate 251 (when battery 52 requires inspection or change) without removing back plate 230.

The arrangement of the electronic components housed within housing 48 is diagrammatically illustrated in FIGS. 8 and 9, and in the arrangement there illustrated, the pen light battery 52 provides a direct current potential to a Fairchild No. UA9914 Medium Power Dual Gate Logic Integrated Circuit indicated at 260, which (as indicated in FIG. 9) is essentially two medium, power "NOR gate," semiconductor logic circuits 262 and 264 each with two gages and one output lead. Semiconductors 262 and 264 are loop connected by suitable capacitors 266 and 268, one each from the output of one amplifier 262 or 264 to one of the input gates of the other, to form a simple free running multivibrator. The input gates of the amplifiers are forward biased by resistors 270 and 272 to provide turn-on current and function with the capacitors 266 and 268 to provide the proper resistance-capacitor time constant for the desired output frequency.

In a specific commercial arrangement, the capacitors 266 and 268 are of 0.1 microfarad size, the resistors 270 and 272 of the 4700 ohm size, and the battery 52 is a 1.5 volt pen light cell, with the result that the resulting multivibrator operates at a frequency of approximately 2 kilohertz.

The alternating current signal provided by the multivibrator, on contact of the probe tip with the gauge liquid, is taken from the output leads of the matched amplifiers 262 and 264 (in one eight pin integrated circuit) and routed so that one side is electrically connected to the probe 30 and the other side is connected to the input side for a four diode bridge rectifier 274 through capacitor 276. When the probe 30 engages the gauge liquid, the alternating signal resulting is full wave rectified and passed to detector gauge 50, which in the embodiments of FIGS. 8 and 9 is in the form of a direct current microammeter 278. The result is that the indicator arm 74 makes a sudden shift to the right from the zero indicia line indicated in FIG. 1, indicating that the micrometer is set for reading.

In the circuiting form 219A of FIG. 10, the alternating current signal is provided by a 4.5 volt pen light battery 52A, and the alternating current signal, after the probe 30 engages the gauge liquid, is routed to the base connection 280 of transistor 282. The base 280 of transistor 282 is leakage biased by resistor 284; lead 286 connects the resistor 284 to the transistor base while lead 288 connects the resistor in series with the negative side of battery 52A. The transistor emitter 290 is also connected to the minus side of battery 52A while the negative lead of the meter 292 is connected to the transistor collector 294.

In this form of the invention, the meter 294 is a direct current volt meter and resistor 284 is of the 27 kilohm size.

On contact of the probe 30 with the gauge liquid, the transistor changes its emitter-to-collector impedance from a high to a low value, thereby providing an almost short circuit to the minus side of battery 52A, which results in the volt meter 292 reading the voltage of the battery 52A less a small drop through the transistor. On removal of the probe from the liquid medium, the transistor 282 assumes a high impedance to the loss of the signal at its base, thereby causing the volt meter 292 to read zero.

The specific items of electrical and electronic equipment employed to make up the circuiting 219 and 219A may be of any suitable commercial make and are applied to the housing 48 in any suitable manner, such as that illustrated in the drawings.

The device 10 provides an inexpensive means of achieving repeatable accuracy within plus or minus 0.00025 inches water column throughout its zero to two inches water column range.

In setting the instrument up for use, it is leveled by adjusting the two front leveling supports 82 and 84, until the bubble in the spirit level 88 is centered in the small circle 89 of the same. Care should be taken to be sure that the liquid level in the gauge coincides with the zero datum line 28 when the device is level, and in this connection, the probe 10 should be disposed out of the gauge liquid in checking this. If the liquid level in the gauge does not coincide with mark 28 (assuming fittings 24 and 26 are open), the quantity of liquid should be adjusted by adding or removing the liquid as required. The gauge liquid preferably is composed of distilled water containing a suitable wetting agent to make it electrically conductive and suitable coloring for ease of viewing.

The device is zeroed by turning the micrometer barrel 36 until its lower edge 42 just coincides with the zero line 44 on the micrometer sleeve 40 and the zero line 34 of the barrel coincides with the line 38 of the sleeve 40. Holding the micrometer barrel 36 stationary, the probe rod 152 is raised or lowered by turning its knurlled knob 155, until the tip 46 of the probe 30 is just above but near the gauge liquid. Watching the read out gauge 50 (assuming the switch 90 has been turned on), and holding the gauge barrel 36, the probe is slowly lowered by turning the knob 155 to bring the probe into contact with the liquid; the contact will be indicated by the gauge 50, after which the probe is lifted out of the fluid by turning the micrometer barrel clockwise to a reading of 0.010 or more.

The probe is again lowered toward the gauge fluid, this time turning the micrometer barrel, and the probe position where the meter pointer 74 begins to move up the meter scale is the zero position and this should correspond to the zero reading on the micrometer. If this is not so, the probe should be adjusted relative to the micrometer barrel. Repeated lowering of the probe or hook, watching the meter for contact, and adjusting the hook should proceed until the micrometer and hook zero positions exactly coincide.

In measuring positive pressures, the source of positive pressure should be applied to the fitting 24. This will permit a simple direct reading to be taken from the micrometer, by backing the micrometer off so that the probe is well above the level assumed by the liquid in well 16, after which the probe is lowered until contact is made, as indicated by the gauge 50. The probe should be withdrawn and reapplied to the liquid several times, noting the micrometer reading each time and the average of these readings multiplied by two is the pressure applied to the device 10 through fitting 24.

For negative pressures (vacuum measurement), the source of vacuum should be applied to fitting 26 and the procedure is as described immediately above.

For differential pressures, the higher pressure is connected to the fitting 24 and the lower pressure is connected to the fitting 26, and the differential is measured by proceeding as already indicated.

It will be seen that the device 10 is fully portable and is fully self contained. If the meter operation becomes sluggish, it is merely necessary to replace the battery, which can be done by removing the separate battery cover 251 for access to battery compartment 202.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. A hook gauge comprising:

a body formed with a pair of upright well chambers in open communication adjacent their bases and adapted to receive a quantity of gauge liquid, said body being U-shaped in configuration and defining a pair of upright spaced apart legs in which the respective chambers are formed and that define a housing mounting space therebetween, said body being mounted on a base plate, means for leveling said base plate, a high pressure connection fitting for one of said chambers, a low pressure connection fitting for the other of said chambers, a probe positioned in said other chamber, means for mounting said probe for movement longitudinally of said other chamber including micrometer means for measuring said movement of said probe, a housing mounted in said mounting space between said body legs, said housing including cell means providing a source of direct current power and means for converting direct current from said source to an alternating current signal, said probe being incorporated in a circuit which includes contact means disposed to be in electrical conducting relation with the gauge liquid when the latter is in said chambers, means in said housing for applying said alternating current signal to said circuit, means in said housing for converting the alternating current signal, when transmitted through the gauge liquid on contact of said probe therewith, to a direct current signal, a direct current detector mounted in said housing, and means in said housing for making said detector responsive to said direct current signal whereby said detector indicates contact of said probe with the gauge liquid in said chamber.

2. The hook gauge set forth in claim 1 wherein:

said housing is releasably clamped against said body on either side thereof to secure same to said body.

3. The hook gauge set forth in claim 1 wherein said circuit includes:

a first length of electrically conductive stripping secured to said body and extending between said probe and said housing mounting space, a second length of electrically conductive stripping secured to said body and extending between said contact means and said housing mounting space, said housing including electrically conductive contacts resiliently biased against the respective strippings at said mounting space to electrically connect same in said circuit.

4. The hook gauge set forth in claim 1 wherein:

gauge liquid is disposed in said well chambers and comprising distilled water containing coloring and a wetting agent.

5. The hook gauge set forth in claim 1 wherein:

said detector includes an indicator arm visible from one side of said gauge, said base plate including a pair of adjustable support legs at either end thereof at said one side of said gauge for leveling said gauge, said base plate being supported along the other side of said gauge by a single leg, and wherein said base plate includes spirit level means adjacent said detector.

* * * * *